United States Patent
Le

(10) Patent No.: US 11,512,029 B1
(45) Date of Patent: Nov. 29, 2022

(54) MULTIPURPOSE FERTILIZER COMPOSITION AND METHOD OF MANUFACTURING THE SAME

(71) Applicant: Thanh Chi Le, Ha Noi (VN)

(72) Inventor: Thanh Chi Le, Ha Noi (VN)

(73) Assignee: VIET NAM HIGH TECHNOLOGY DEVELOPMENT INVESTMENT CORPORATION, Ha Noi (VN)

( * ) Notice: Subject to any disclaimer, the term of this patent is extended or adjusted under 35 U.S.C. 154(b) by 0 days.

(21) Appl. No.: 17/817,356

(22) Filed: Aug. 4, 2022

(51) Int. Cl.
| | |
|---|---|
| *C05G 1/00* | (2006.01) |
| *C05F 17/40* | (2020.01) |
| *C05F 5/00* | (2006.01) |
| *C05F 17/20* | (2020.01) |
| *C05F 17/10* | (2020.01) |
| *C05F 11/00* | (2006.01) |
| *C05D 9/02* | (2006.01) |
| *C05F 3/00* | (2006.01) |

(52) U.S. Cl.
CPC ............. *C05G 1/00* (2013.01); *C05D 9/02* (2013.01); *C05F 3/00* (2013.01); *C05F 5/002* (2013.01); *C05F 11/00* (2013.01); *C05F 17/10* (2020.01); *C05F 17/20* (2020.01); *C05F 17/40* (2020.01)

(58) Field of Classification Search
None
See application file for complete search history.

(56) References Cited

U.S. PATENT DOCUMENTS

| | | | | |
|---|---|---|---|---|
| 2012/0208254 A1* | 8/2012 | Smith | ............ | C10B 47/44 435/292.1 |
| 2014/0024529 A1* | 1/2014 | Smith | ............ | C05F 11/00 504/117 |
| 2020/0131096 A1* | 4/2020 | Kanagalingam | ........ | C05F 17/20 |

\* cited by examiner

*Primary Examiner* — Wayne A Langel

(57) ABSTRACT

A multipurpose fertilizer composition comprising an after incubation mixture, a moisturizing ingredient, and a ylang ylang extract ingredients; wherein, the ylang ylang extract ingredients from fresh ylang ylang flowers that can be chopped/or not shredded and soaked in a liquid such as water or solvent for a long time to extract the necessary compound components from the infused ylang ylang flowers into the liquid; wherein, the ylang ylang extract ingredients containing at least 0.05% by weight of a cinnamyl acetate. Besides, the present invention is to provide a process of manufacturing the multipurpose fertilizer composition using ingredients source material from mixing a manure ingredient with a poultry manure ingredient, and an organic waste ingredient.

6 Claims, 1 Drawing Sheet

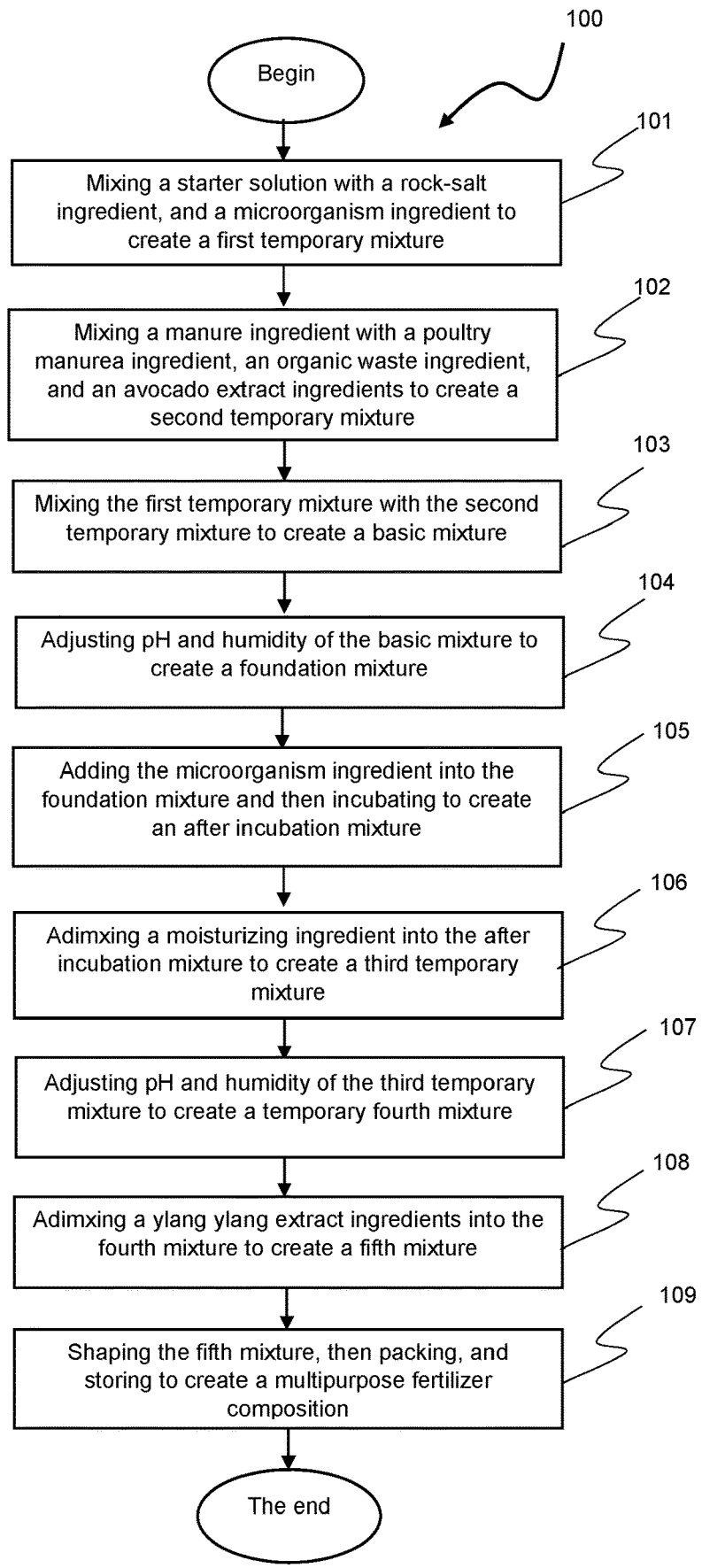

MULTIPURPOSE FERTILIZER COMPOSITION AND METHOD OF MANUFACTURING THE SAME

FIELD OF THE INVENTION

The present invention relates to the field of fertilizer production, specifically relating to a fertilizer production process applied to keeping plants moist during drought and water shortages and soil improvement. More specifically, the present invention relates to a multipurpose fertilizer composition and method of manufacturing the same.

BACKGROUND ART

Every year, Vietnam uses about 10 million tons of fertilizers and tens of thousands of pesticides in agricultural production. The world and Vietnam have appeared with new types of fertilizers, environmentally friendly, in line with the trend of sustainable agricultural development. Producing and using new generation fertilizers is one of the trends of high-tech application in agriculture today. Fertilizers help increase crop yields, improve soil, and not harm the environment. Current research and production trends focus on organic fertilizers from biochar, specialized fertilizers, available fertilizers, and nanotechnology fertilizers.

Typically, fertilizer companies often produce and circulate some multi-element fertilizers containing only macronutrients (N, P, K), so they are often referred to as NPK fertilizers used for many objects (crops, soil, etc.) plant). It is time to apply fertilizers containing enough N, P, K, and intermediate elements (S, Ca, Mg, Si) for plants, as they become deficient and limit the yield and quality of products. Even though the macronutrients (N, P, K) have been provided enough in plants to help farmers apply balanced and reasonable fertilizers, the production of specialized multi-element fertilizers must be ensured for each fertilizing period for a particular crop.

Due to many changes in weather and climate laws and the indiscriminate use of irrigation water sources, there have been, are, and will occur local droughts causing severe damage to crops. Suppose the maximum amount of water for crop irrigation is minimized, but their average growth and development are ensured. In that case, it will reduce the pressure on water resources in a densely populated country like Vietnam, especially in the dried. In order to cultivate effectively during the dry season and limit the risks caused by drought, the use of methods to reduce the water evaporation rate and increase the soil's water holding capacity is considered one of the solutions. Most effective method. In addition to measures such as watering sparingly, mulching the soil (covering the soil), applying organic fertilizers, and choosing drought-resistant crops, one of the measures that prove to be highly effective is the application of a humectant to fertilize the soil to increase the water holding capacity of the soil and help plants increase biomass and yield in arid conditions.

According to Patent No. CN104030819A, the invention refers to a moisturizing fertilizer, which includes the following ingredients by weight: 35-56 parts inorganic fertilizer, 20-40 parts organic fertilizer, 5-10 parts sodium humate, 1-6 parts acrylic acid—acrylamide, 1-6 parts ammonium magnesium phosphate and 4-16 parts packed. Moisturizing fertilizer disclosed by the invention, the inorganic-organic compound in fertilizer is taken as the inner core, ammonium magnesium phosphate is taken as an immediate layer, and acrylic acid compound absorbent material —acrylamide and sodium humate are taken as the outer layer.

According to Patent No. CN102951960A, the invention refers to an inorganic-organic bio-fertilizer to retain moisture and loosen soil, consisting of the following materials by weight: 95-100 parts inorganic—organic compound fertilizer, 0.5-1.5 parts lauryl alcohol ethyl ammonium sulfate (not less than 25%), 0.5-1.5 parts polymeric water-retaining agent and 0.5-1.5 parts microbiological agent.

According to Patent No. CN106588372A, the invention refers to fertilizers that maintain moisture for plants. Fertilizer for maintaining moisture and fertilizer for plants is prepared from the following raw materials by weight: 10-16 parts manure, 20-30 parts rice bran, 15-25 parts wood dust, 2-3 parts magnesium sulfate, 1-2 parts zinc chloride, 1.5-2.5 parts calcium carbonate, 1-2 parts EDTA (Ethylene Diamine Tetraacetic Acid) ferric chelate, 0.8-1.6 parts ammonium molybdate, 15-30 parts nitramine, 20-30 parts potassium nitrate, 25-35 parts diammonium phosphate, 50-90 parts urea, 2-4 parts modified grass carbon, 4-8 parts sodium borate, 2-6 parts attapulgite, 1-2 parts boric acid, 2-3 parts N-thiophosphoric triamide and 1.5-2.5 parts hydroquinone.

According to Patent No. CN105503448A, the invention refers to a special inorganic fertilizer with the functions of moisture retention, fertilizer holding, and soil consolidation. Special inorganic fertilizers are prepared from N, P2O5, K2O, super absorbent resins, and high polymers in a mass ratio of 10:5:5:2:2. Special inorganic fertilizers are formulated with can achieve the effects of improving water and fertilizer efficiency, reducing labor intensity, saving labor, increasing labor, reducing water and soil loss, which are expected to improve productivity and quality amount of forage.

The above inventions meet the specific purposes and requirements of a technical solution. However, the above inventions only refer to moisturizing fertilizers and fertilizer ingredients, but the disclosure of the invention does not in detail the processes for preparing ingredients and steps for mixing and preparing to create a multipurpose fertilizer. More especially, the disclosure of the invention does not in detail the chemical ingredients of the fertilizer, incubation mixture containing chemical components consisting of an elemental nitrogen (N) having 28%-30% by weight, an elemental phosphorus (P) having 1%-1.5% by weight, an elemental potassium (K) having 2.5%-3% by weight, an elemental sulfur (S) having 0.9%-1% by weight, an elemental calcium (Ca) having 23%-25% by weight, an elemental magnesium (Mg) having 0.9%-1% by weight, an elemental carbon (C) having 34%-35% by weight, an elemental copper (Cu) having 0.005%-0.01% by weight, an elemental zinc (Zn) having 0.025%-0.1% by weight, an elemental manganese (Mn) having 0.025%-0.1% by weight, an elemental iron (Fe) having 0.5%-1% by weight, an elemental bo (B) having 0.002%-0.1% by weight, an elemental molybdenum (Mo) having 0.0003%-0.01% by weight, an elemental cadmium (Cd) having at least 0.00005% by weight, an elemental lead (Pb) having at least 0.0001% by weight, and an elemental mercury (Hg) having at least 0.0001% by weight.

Therefore, it is necessary to create a process of manufacturing the multipurpose fertilizer that provides an adequate supply of nutrients for plants, increased absorption of minerals, and limited minerals washed away when flooded or evaporated in drought while balancing pH and keeping the soil moist, saving costs and production time.

Furthermore, it is necessary to create a process of manufacturing the multipurpose fertilizer have using ingredients source material from mixing a manure ingredient with a poultry manure ingredient, an organic waste ingredient, and a microorganism ingredient that metabolizes nutrients that increase the nutritional value of the obtained fertilizer while contributing to reducing environmental pollution, balancing microorganisms, providing humus, and limiting leaching and soil erosion.

It is necessary to create a process of manufacturing the multipurpose fertilizer that uses available, abundant waste materials with low cost but high nutritional content, which is the organic waste ingredient including durian shell, by-products jackfruit, spoiled poultry eggshells or eggs is a spoiled chicken eggshell or egg.

Finally, It is necessary to create a multipurpose fertilizer obtained from the above process with valuable features and effects that have contributed to reducing the use of chemical fertilizers, increasing the quality of agricultural products, preserving soil fertility, and limiting pollution of agricultural land, pollution of groundwater, and river systems.

The invention provides solutions to achieve the above objectives.

SUMMARY OF THE INVENTION

Accordingly, an objective of the present invention is to provide a multipurpose fertilizer composition comprising an after incubation mixture, a moisturizing ingredient, and a ylang ylang extract ingredients; wherein a starter solution, a rock-salt ingredient, a microorganism ingredient, a micronutrient solution, a manure ingredient, a poultry manure ingredient, an organic waste ingredient, and an avocado extract ingredients, all are transformed by predefined process that yields chemical components of the after incubation mixture form consisting of an elemental nitrogen (N) having 28%-30% by weight, an elemental phosphorus (P) having 1%-1.5% by weight, an elemental potassium (K) having 2.5%-3% by weight, an elemental sulfur (S) having 0.9%-1% by weight, an elemental calcium (Ca) having 23%-25% by weight, an elemental magnesium (Mg) having 0.9%-1% by weight, an elemental carbon (C) having 34%-35% by weight, an elemental copper (Cu) having 0.005%-0.01% by weight, an elemental zinc (Zn) having 0.025%-0.1% by weight, an elemental manganese (Mn) having 0.025%-0.1% by weight, an elemental iron (Fe) having 0.5%-1% by weight, an elemental bo (B) having 0.002%-0.1% by weight, an elemental molybdenum (Mo) having 0.0003%-0.01% by weight, an elemental cadmium (Cd) having at least 0.00005% by weight, an elemental lead (Pb) having at least 0.0001% by weight, and an elemental mercury (Hg) having at least 0.0001% by weight.

Another objective of the present invention is to provide a moisturizing ingredient created by mixing performed in a specific order from (a') to (c') comprising:

(a') preparing materials including an extracted pectin from the dragon fruit peel, acrylic acid, potassium persulfate, ethylene glycol dimethacrylate, Ammonium oxalate 0.25%, methanol, and protease enzyme;
wherein the extracted pectin from the dragon fruit peel created by steps comprising:
choosing thick dragon fruit peel, non-rotten having a moisture of 80%-90%;
drying dragon fruit peel at 50° C.-60° C. for 20 hours to create a dried dragon fruit peel having moisture of 9%-10%;
pulverizing the dried dragon fruit peel having sizes from 1 to 2 mm to create pieces of dragon fruit peel;
extracting the dried dragon fruit peel mixture by ammonium oxalate 25% at 80° C.-90° C. for 30-40 minutes to create an extracted solution;
filtering the extract solution to create a first solution and a residue;
hydrolyzing the residue by protease enzyme at the temperature of 30° C.-40° C. for 50-60 minutes, then filtered by filter paper to create a second solution;
admixing the first solution with the second solution to create a third solution;
admixing the third solution with methanol to a ratio of 1:1 for 45 minutes to create a fourth solution;
centrifuging the fourth solution stirring at 300 rpm for 15 minutes to create a precipitate solution;
filtering and washing the precipitate solution with methanol to create a precipitate solution white;
drying and filtering the precipitate solution white at the temperature of 50° C.-60° C. for 20 hours to create the extracted pectin from the dragon fruit peel having a moisture of 9%-10%;

(b') grafting onto the extracted pectin from the dragon fruit peel with acrylic acid by steps comprising:
dissolving homogeneously 25-30 g of the extracted pectin from the dragon fruit peel into the water;
adding 0.1-0.3 g potassium persulfate with the combination of stirring at 70° C. for 30 min;
adding 40-50 mL acrylic acid with the combination of stirring at 50° C. for 10 min;
adding 0.1-0.3 g ethylene glycol dimethacrylate with the combination of stirring for 2-5 minutes, then do not stir for 2-3 hours to create a pectin-acrylic acid mixture; and (c') washing the pectin-acrylic acid mixture with deionized water, then drying at 70° C.-80° C. to constant weight to create the moisturizing ingredient.

Yet another objective of the present invention is to provide a process of manufacturing the multipurpose fertilizer composition comprising:

(i) mixing a starter solution with a rock-salt ingredient, and a microorganism ingredient, then all incubated at temperature 40° C. for 10 hours to create a first temporary mixture; wherein the starter solution having 10%-15% by weight, the rock-salt ingredient having 2% by weight, and the microorganism ingredient having 0.01% by weight;

(ii) mixing a manure ingredient with a poultry manure ingredient, an organic waste ingredient, and an avocado extract ingredients; then all continuously stirring at an average speed of 200-500 rpm for 15 minutes to create a second temporary mixture; wherein the manure ingredient having 35% by weight, the poultry manure ingredient having 20% by weight, the organic waste ingredient having 15% by weight, and the avocado extract ingredients having 0.5%-3% by weight;

(iii) mixing the first temporary mixture at step (i) with the second temporary mixture at step (ii), and a micronutrient solution having 12% by weight to create a basic mixture;

(iv) adjusting pH and humidity of the basic mixture at step (iii) to create a foundation mixture;
wherein adjusting the humidity of the basic mixture to 72%-75%;
wherein adjusting the pH of the basic mixture to pH=7;

(v) adding 0.04% by weight of the microorganism ingredient into the foundation mixture at step (iv), and then incubating for 30-35 days with humidity of 72%-75% with the combination of stirring with the frequency of once every two days for 10-15 minutes at an average speed of 50-100 rpm, that to create an after incubation mixture;

(vi) adding 5%-6% by weight of a moisturizing ingredient into the after incubation mixture at step (v) to create a third temporary mixture;
(vii) adjusting pH and humidity of the third temporary mixture at step (vi) to create a temporary fourth mixture; wherein adjusting the humidity of the third temporary mixture to 32%-35%;
wherein adjusting the pH of the third temporary mixture to 7-7.5;
(viii) adding a ylang ylang extract ingredients into the fourth mixture at step (vii) create to a fifth mixture; wherein the ylang ylang extract ingredients having 0.75%-1% by weight; wherein the ylang ylang extract ingredients from fresh ylang ylang flowers that can be chopped/or not shredded and soaked in a liquid such as water or solvent for a long time to extract the necessary compound components from the infused ylang ylang flowers into the liquid;
wherein the ylang ylang extract ingredients containing at least 0.05% by weight of a cinnamyl acetate; and
(ix) shaping the fifth mixture to pre-determined sizes, then packing and storing to create the multipurpose fertilizer composition.

Another objective of the present invention is to provide a process of manufacturing the multipurpose fertilizer composition using a manure ingredient with a poultry manure ingredient, and an organic waste ingredient;
wherein the manure ingredient created by mixing a goat manure ingredient with a pig manure ingredient, and a cow manure ingredient;
wherein a ratio of the goat manure ingredient having moisture of 30%-35% with the pig manure ingredient having moisture of 30%-35%, and the cow manure ingredient having moisture of 30%-35% having 1:1:2;
wherein the poultry manure ingredient created by mixing a chicken manure ingredient with a duck manure ingredient, and a quail manure ingredient; wherein a ratio of the chicken manure ingredient having moisture of 30%-35% with the duck manure ingredient having moisture of 30%-35%, and the quail manure ingredient having moisture of 30%-35% having 4:2:1; and
wherein the organic waste ingredient including durian peel, jackfruit waste, and poultry eggshells or spoiled poultry eggs; then all treated at 85° C.-100° C. for 30 minutes, then grinding and hydrolyzing with an enzyme solution;
  wherein said jackfruit waste choosing from one or more components including jackfruit peel, jackfruit fiber, and jackfruit seeds;
  wherein said poultry eggshells or spoiled poultry eggs are chicken eggshells, spoiled chicken eggshells;
  wherein said enzyme solution created by mixing a ratio of cellulose enzyme, amylase enzyme, and protease enzyme having 2:2:1.

In view of the foregoing, another objective of the present invention is to provide a process of manufacturing the multipurpose fertilizer composition have using a micronutrient solution; wherein 1 liter of the micronutrient solution created by mixing performed in a specific order from (A) to (G) comprising:
  (A) diluting 0.1 liter of 68% $HNO_3$ into 0.3 liter of water to create a dilute solution of $HNO_3$;
  (B) adding 100 g of a multi-metallic ore powder into the dilute solution of $HNO_3$ at step (A), and continuously stirring at 25° C.-27° C. for 30 minutes; then, increase the temperature to 70° C.-80° C. and continuously stirring for 10 minutes to create a first solution;
  (C) filtering the first solution at step (B) by filter paper, creating a first residues;
  (D) adding 0.1 liter of $HNO_3$ 68% into the first residues at step (C), continuously stirring for 30 minutes at 75° C.-90° C., then filtered by filter paper to create a second residue;
  (E) adding 0.8 liter of aqua regia solution into the second residue at step (D), continuously stirring at 95° C.-110° C. for 30 minutes; then filtered by filter paper to create a filtrate; wherein the aqua regia solution including 0.6 liter HCl 36% and 0.2 liter $HNO_3$ 68%;
  (F) adjusting pH of the filtrate at step (E) by $NH_4OH$ solution until the filtrate having pH=8;
  (G) adding water into the filtrate having pH=8 just enough 1 liter to create 1 liter of the micronutrient solution.

Finally, the purpose of the invention is to provide a process of manufacturing the multipurpose fertilizer composition have using the microorganism ingredient, including *Azotobacter chroococcum* having a density of at least 109 CFU/g, *Bacillus polyfermenticus* having a density at least 109 CFU/g, *Saccharomyces, Streptomyces* at least 107 CFU/g, and *Trichoderma* at least 103 CFU/g.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 is a flowchart illustrating a flowchart of a process of manufacturing multipurpose the fertilizer composition based on the above principle in accordance with an exemplary embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

One embodiment of the invention is now described with reference to FIG. 1, a process of manufacturing multipurpose fertilizer composition ("method 100"). Method 100 is started with step 101 that mixing a starter solution with a rock-salt ingredient, and a microorganism ingredient, then all incubated at temperature 40° C. for 10 hours to create a first temporary mixture; wherein the starter solution having 10%-15% by weight, the rock-salt ingredient having 2% by weight, and the microorganism ingredient having 0.01% by weight.

In the embodiment of the present invention, percent mass or percentage (%) by weight=(mass of solute/mass of solution)×100%. The unit of mass is usually grams. Mass percent is also known as the correct percentage by weight or w/w %. It should also be noted that the molar mass is also within the meaning of the invention. Molar mass is the total mass of all atoms in a mole of compound. Total all volume percentages add up to 100%.

According to the preferred embodiment of the present invention, the starter solution created by mixing performed in a specific order from (a) to (f) comprising:
(a) preparing root vegetables including a beetroot, a sugar beet, and a radish;
(b) washing, chopping, or grinding the root vegetables at step (a) to create a pretreatment root vegetable;
(c) creating a hydrolyzed mixture by hydrolyzing the pretreatment root vegetable at step (b) with an enzyme solution for 5 minutes; wherein the enzyme solution is obtained by mixing a ratio of cellulose enzyme, amylase enzyme, and protease enzyme having 2:2:1;
(d) adding water to the hydrolyzed mixture at step (c) to a ratio of 5:1, with combination of stirring and heating at 85° C.-100° C. for 10 minutes to create a mixture after heating;
(e) creating a filter solution by filtering the mixture after heating at step (d);
(f) condensing the filter solution at step (e) at 85° C.-100° C. for 30-45 minutes to create the starter solution.

According to the embodiment of the present invention, the rock-salt is salt taken from an underground salt mine, after mining, is crushed and refined to get NaCl (Sodium Chloride) in the form of minerals.

According to the preferred embodiment of the present invention, the microorganism ingredient at step 101 including *Azotobacter chroococcum* having a density of at least 109 CFU/g, *Bacillus polyfermenticus* having a density at least 109 CFU/g, *Saccharomyces*, *Streptomyces* at least 107 CFU/g, and *Trichoderma* at least 103 CFU/g.

At step 102, mixing a manure ingredient with a poultry manure ingredient, an organic waste ingredient, and an avocado extract ingredients; then all continuously stirring at an average speed of 200-500 rpm for 15 minutes to create a second temporary mixture; wherein the manure ingredient having 35% by weight, the poultry manure ingredient having 20% by weight, the organic waste ingredient having 15% by weight, and the avocado extract ingredients having 0.5%-3% by weight.

According to the preferred embodiment of the present invention, the manure ingredient is created by mixing a goat manure ingredient with a pig manure ingredient, and a cow manure ingredient.

According to the preferred embodiment of the present invention, the goat manure ingredient having moisture of 30%-35%, the pig manure ingredient having moisture of 30%-35%, and the cow manure ingredient having moisture of 30%-35%.

According to the preferred embodiment of the present invention, a ratio of the goat manure ingredient having moisture of 30%-35% with the pig manure ingredient having moisture of 30%-35%, and the cow manure ingredient having moisture of 30%-35% having 1:1:2.

According to the preferred embodiment of the present invention, the organic waste ingredient including durian peel, jackfruit waste, and poultry eggshells or spoiled poultry eggs; then all treated at 85° C.-100° C. for 30 minutes, then grinding and hydrolyzing with an enzyme solution.

According to the embodiment of the present invention, jackfruit waste choosing from one or more components including jackfruit peel, jackfruit fiber, and jackfruit seeds. Poultry eggshells or spoiled poultry eggs are chicken eggshells, spoiled chicken eggshells.

According to the embodiment of the present invention, enzyme solution created by mixing a ratio of cellulose enzyme, amylase enzyme, and protease enzyme having 2:2:1.

According to the embodiment of the present invention, the avocado extract ingredients is a plant material that can be chopped/or not shredded and soaked in a liquid such as water or solvent for a long time to extract the necessary compound components from the infused avocado into the liquid.

At step 103, mixing the first temporary mixture at step 101 with the second temporary mixture at step 102, and a micronutrient solution having 12% by weight to create a basic mixture.

According to the preferred embodiment of the present invention, 1 liter of the micronutrient solution created by mixing performed in a specific order from (A) to (G) comprising:
(A) diluting 0.1 liter of 68% $HNO_3$ into 0.3 liter of water to create a dilute solution of $HNO_3$;
(B) adding 100 g of a multi-metallic ore powder into the dilute solution of $HNO_3$ at step (A), and continuously stirring at 25° C.-27° C. for 30 minutes; then, increase the temperature to 70° C.-80° C. and continuously stirring for 10 minutes to create a first solution;
(C) filtering the first solution at step (B) by filter paper, creating a first residues;
(D) adding 0.1 liter of $HNO_3$ 68% into the first residues at step (C), continuously stirring for 30 minutes at 75° C.-90° C., then filtered by filter paper to create a second residue;
(E) adding 0.8 liter of aqua regia solution into the second residue at step (D), continuously stirring at 95° C.-110° C. for 30 minutes; then filtered by filter paper to create a filtrate; wherein the aqua regia solution including 0.6 liter HCl 36% and 0.2 liter $HNO_3$ 68%;
(F) adjusting pH of the filtrate at step (E) by $NH_4OH$ solution until the filtrate having pH=8;
(G) adding water into the filtrate having pH=8 just enough 1 liter to create 1 liter of the micronutrient solution.

Within the scope of the present invention, the term "multi-metallic ore powder" meanings are the product of the process of enriching the primary ore by a method or a combination of several enrichment methods such as sieving, grading according to grain size, gravity selection, magnetic selection, electrolysis, etc. flotation or chemical treatment to improve the content of useful elements and reduce the content of harmful elements in the ore. Concentrated ore powder has a content of useful elements higher than that of harmful elements compared to their content in primary ore and meets the requirements of being used as a production material in any manufacturing sector.

Continuing FIG. 1, at step 104 adjusting pH and humidity of the basic mixture at step 103 to create a foundation mixture; wherein adjusting the humidity of the basic mixture to 72%-75%; and adjusting the pH of the basic mixture to pH=7. At step 104 to create the foundation mixture.

Within the scope of the present invention, the term "foundation mixture" includes the following meanings:

(a) A foundation mixture is created by mixing the starter solution, the rock-salt, the microorganism ingredient, the manure ingredient, the poultry manure ingredient, the organic waste ingredient, the avocado extract ingredients, and the micronutrient solution having a predefined percentage (%) by weight;

(b) A foundation mixture is a mixture that provides a full range of nutritional ingredients, also known as foundation substrates ingredients, which are eligible for incubation at step 105 after adding the microorganism ingredient.

At step 105, adding 0.04% by weight of the microorganism ingredient into the foundation mixture at step 104, and then incubating for 30-35 days with humidity of 72%-75% with the combination of stirring with the frequency of once every two days, wherein once every for 10-15 minutes at an average speed of 50-100 rpm, that to create an after incubation mixture.

According to the embodiment of the present invention, the starter solution, the rock-salt ingredient, the microorganism ingredient, the micronutrient solution, the manure ingredient, the poultry manure ingredient, the organic waste ingredient, and the avocado extract ingredients, all are transformed by the process from step 101 to step 105 that yields chemical components of the after incubation mixture form consisting of: an elemental nitrogen (N) having 28%-30% by weight, an elemental phosphorus (P) having 1%-1.5% by weight, an elemental potassium (K) having 2.5%-3% by weight, an elemental sulfur (S) having 0.9%-1% by weight, an elemental calcium (Ca) having 23%-25% by weight, an elemental magnesium (Mg) having 0.9%-1% by weight, an elemental carbon (C) having 34%-35% by weight, an elemental copper (Cu) having 0.005%-0.01% by weight, an elemental zinc (Zn) having 0.025%-0.1% by weight, an elemental manganese (Mn) having 0.025%-0.1% by weight, an elemental iron (Fe) having 0.5%-1% by weight, an elemental bo (B) having 0.002%-0.1% by weight, an elemental molybdenum (Mo) having 0.0003%-0.01% by weight, an elemental cadmium (Cd) having at least 0.00005% by weight, an elemental lead (Pb) having at least 0.0001% by weight, and an elemental mercury (Hg) having at least 0.0001% by weight.

According to the preferred embodiment of the present invention, the microorganism ingredient at step 105 including *Azotobacter chroococcum* having a density of at least 109 CFU/g, *Bacillus polyfermenticus* having a density at least 109 CFU/g, *Saccharomyces, Streptomyces* at least 107 CFU/g, and *Trichoderma* at least 103 CFU/g.

Within the scope of the present invention, the term "after incubation mixture" having including the meanings:

(a') An after incubation mixture is the product obtained if and only if the foundation mixture is incubated at step 105;

(b') An after incubation mixture act as a reactant allowing the moisturizing ingredient, and the ylang ylang extract ingredients to contribute their chemical and physicochemical properties to create a new composition;

(c') An after incubation mixture including the chemical bonds with the moisturizing ingredient, and the ylang ylang extract ingredients such as ionization reaction, covalent reaction, reduction reaction, substitution reaction, and rearrangement reaction to create a new chemical components;

(d') An after incubation mixture containing chemical components consisting of an elemental nitrogen (N) having 28%-30% by weight, an elemental phosphorus (P) having 1%-1.5% by weight, an elemental potassium (K) having 2.5%-3% by weight, an elemental sulfur (S) having 0.9%-1% by weight, an elemental calcium (Ca) having 23%-25% by weight, an elemental magnesium (Mg) having 0.9%-1% by weight, an elemental carbon (C) having 34%-35% by weight, an elemental copper (Cu) having 0.005%-0.01% by weight, an elemental zinc (Zn) having 0.025%-0.1% by weight, an elemental manganese (Mn) having 0.025%-0.1% by weight, an elemental iron (Fe) having 0.5%-1% by weight, an elemental bo (B) having 0.002%-0.1% by weight, an elemental molybdenum (Mo) having 0.0003%-0.01% by weight, an elemental cadmium (Cd) having at least 0.00005% by weight, an elemental lead (Pb) having at least 0.0001% by weight, and an elemental mercury (Hg) having at least 0.0001% by weight.

At step 106, admixing 5%-6% by weight of a moisturizing ingredient into the after incubation mixture at step 105 to create a third temporary mixture.

It is also noted that the terminology the term "admixing" the following meanings used in the present invention means mixing, adding, reacting, or dissolving homogeneously with composite to create chemical bonds, including but not limited to addition reactions, photochemical reactions, redox reactions, substitution reactions, cyclic closing reactions, cleavage reactions, and other reactions to create the new chemical components.

According to the preferred embodiment of the present invention, the moisturizing ingredient created by mixing performed in a specific order from (a') to (c') comprising:

(a') preparing materials including an extracted pectin from the dragon fruit peel, acrylic acid, potassium persulfate, ethylene glycol dimethacrylate, Ammonium oxalate 0.25%, methanol, and protease enzyme;

wherein the extracted pectin from the dragon fruit peel created by steps comprising: choosing thick dragon fruit peel, non-rotten having a moisture of 80%-90%;

drying dragon fruit peel at 50° C.-60° C. for 20 hours to create a dried dragon fruit peel having moisture of 9%-10%;

pulverizing the dried dragon fruit peel having sizes from 1 to 2 mm to create pieces of dragon fruit peel;

extracting the dried dragon fruit peel mixture by ammonium oxalate 25% at 80° C.-90° C. for 30-40 minutes to create an extracted solution;

filtering the extract solution to create a first solution and a residue;

hydrolyzing the residue by protease enzyme at the temperature of 30° C.-40° C. for 50-60 minutes, then filtered by filter paper to create a second solution;

admixing the first solution with the second solution to create a third solution; admixing the third solution with methanol to a ratio of 1:1 for 45 minutes to create a fourth solution;

centrifuging the fourth solution stirring at 300 rpm for 15 minutes to create a precipitate solution;

filtering and washing the precipitate solution with methanol to create a precipitate solution white;

drying and filtering the precipitate solution white at the temperature of 50° C.-60° C. for 20 hours to create the extracted pectin from the dragon fruit peel having a moisture of 9%-10%;

(b') grafting onto the extracted pectin from the dragon fruit peel with acrylic acid by steps comprising:

dissolving homogeneously 25-30 g of the extracted pectin from the dragon fruit peel into the water;

adding 0.1-0.3 g potassium persulfate with the combination of stirring at 70° C. for 30 min;

adding 40-50 mL acrylic acid with the combination of stirring at 50° C. for 10 min; adding 0.1-0.3 g ethylene glycol dimethacrylate with the combination of stirring for 2-5 minutes, then do not stir for 2-3 hours to create a pectin-acrylic acid mixture; and (c') washing the pectin-acrylic acid mixture with deionized water, then drying at 70° C.-80° C. to constant weight to create the moisturizing ingredient.

Within the scope of the present invention, the term "homogeneously dissolved" the following meanings of the completely dissolved state or homogenous dissolution of substances in the same mixture/solution.

At step 107, adjusting pH and humidity of the third temporary mixture at step 106 to create a temporary fourth mixture. According to the preferred embodiment of the present invention, adjusting the humidity of the third temporary mixture to 32%-35%, and adjusting the pH of the third temporary mixture to 7-7.5.

At step 108, admixing a ylang ylang extract ingredients into the fourth mixture at step 107 create to a fifth mixture; wherein the ylang ylang extract ingredients having 0.75%-1% by weight. According to the embodiment of the present invention, the ylang ylang extract ingredients from fresh ylang ylang flowers that can be chopped/or not shredded and soaked in a liquid such as water or solvent for a long time to extract the necessary compound components from the infused ylang ylang flowers into the liquid.

In the embodiment of the present invention, the ylang ylang extract ingredients containing at least 0.05% by weight of a cinnamyl acetate.

Finally, at step 109, shaping the fifth mixture at step 108 to pre-determined sizes, then packing and storing to create a multipurpose fertilizer composition.

In the embodiment of the present invention, steps 101-103, 105-106, and 108 is performed by stirring apparatus, agitator, mixing equipment, and other similar types of equipment have been known in previous art so the description of the structure and its operating principle will not be described in detail in the invention.

According to the embodiment taken as an example of the invention, the multipurpose fertilizer composition created from method 100 is used as a basal fertilizing or top dressing for all crops.

According to another embodiment of the present invention, a multipurpose fertilizer composition comprising an after incubation mixture, a moisturizing ingredient, and a ylang ylang extract ingredients. The after incubation mixture is obtained by mixing performed in a specific order from (i) to (v) comprising:

(i) mixing a starter solution with a rock-salt ingredient, and a microorganism ingredient, then all incubated at temperature 40° C. for 10 hours; creating a first temporary mixture; wherein the starter solution having 10%-15% by weight, the rock-salt ingredient having 2% by weight, and the microorganism ingredient having 0.01% by weight;

wherein the starter solution created by mixing performed in a specific order from (a) to (f) comprising:

(a) preparing root vegetables including a beetroot, a sugar beet, and a radish;

(b) washing, chopping, or grinding the root vegetables at step (a) to create a pretreatment root vegetable;

(c) creating a hydrolyzed mixture by hydrolyzing the pretreatment root vegetable at step (b) with an enzyme solution for 5 minutes; wherein the enzyme solution is obtained by mixing a ratio of cellulose enzyme, amylase enzyme, and protease enzyme having 2:2:1;

(d) adding water to the hydrolyzed mixture at step (c) to a ratio of 5:1, with combination of stirring and heating at 85° C.-100° C. for 10 minutes to create a mixture after heating;

(e) creating a filter solution by filtering the mixture after heating at step (d);

(f) condensing the filter solution at step (e) at 85° C.-100° C. for 30-45 minutes to create the starter solution;

(ii) mixing a manure ingredient with a poultry manure ingredient, an organic waste ingredient, and an avocado extract ingredients; then all continuously stirring at an average speed of 200-500 rpm for 15 minutes to create a second temporary mixture; wherein the manure ingredient having 35% by weight, the poultry manure ingredient having 20% by weight, the organic waste ingredient having 15% by weight, and the avocado extract ingredients having 0.5%-3% by weight;

the manure ingredient created by mixing a goat manure ingredient with a pig manure ingredient, and a cow manure ingredient; wherein a ratio of the goat manure ingredient having moisture of 30%-35% with the pig manure ingredient having moisture of 30%-35%, and the cow manure ingredient having moisture of 30%-35% having 1:1:2;

the poultry manure ingredient created by mixing a chicken manure ingredient with a duck manure ingredient, and a quail manure ingredient; wherein a ratio of the chicken manure ingredient having moisture of 30%-35% with the duck manure ingredient having moisture of 30%-35%, and the quail manure ingredient having moisture of 30%-35% having 4:2:1;

the organic waste ingredient including durian peel, jackfruit waste, and poultry eggshells or spoiled poultry eggs; then all treated at 85° C.-100° C. for 30 minutes, then grinding and hydrolyzing with an enzyme solution;

wherein said jackfruit waste choosing from one or more components including jackfruit peel, jackfruit fiber, and jackfruit seeds;

wherein said poultry eggshells or spoiled poultry eggs are chicken eggshells, spoiled chicken eggshells;

wherein said enzyme solution created by mixing a ratio of cellulose enzyme, amylase enzyme, and protease enzyme having 2:2:1;

the avocado extract ingredients is a plant material that can be chopped/or not shredded and soaked in a liquid such as water or solvent for a long time to extract the necessary compound components from the infused avocado into the liquid;

(iii) mixing the first temporary mixture at step (i) with the second temporary mixture at step (ii), and a micronutrient solution having 12% by weight to create a basic mixture; wherein 1 liter of the micronutrient solution created by mixing performed in a specific order from (A) to (G) comprising:

(A) diluting 0.1 liter of 68% $HNO_3$ into 0.3 liter of water to create a dilute solution of $HNO_3$;

(B) adding 100 g of a multi-metallic ore powder into the dilute solution of $HNO_3$ at step (A), and continuously stirring at 25° C.-27° C. for 30 minutes; then, increase the temperature to 70° C.-80° C. and continuously stirring for 10 minutes to create a first solution;

(C) filtering the first solution at step (B) by filter paper, creating a first residues;

(D) adding 0.1 liter of $HNO_3$ 68% into the first residues at step (C), continuously stirring for 30 minutes at 75° C.-90° C., then filtered by filter paper to create a second residue;

(E) adding 0.8 liter of aqua regia solution into the second residue at step (D), continuously stirring at 95° C.-110° C. for 30 minutes; then filtered by filter paper to create a filtrate; wherein the aqua regia solution including 0.6 liter HCl 36% and 0.2 liter $HNO_3$ 68%;

(F) adjusting pH of the filtrate at step (E) by $NH_4OH$ solution until the filtrate having pH=8;

(G) adding water into the filtrate having pH=8 just enough 1 liter to create 1 liter of the micronutrient solution;

(iv) adjusting pH and humidity of the basic mixture at step (iii) to create a foundation mixture;

wherein adjusting the humidity of the basic mixture to 72%-75%;

wherein adjusting the pH of the basic mixture to pH=7;

(v) adding 0.04% by weight of the microorganism ingredient into the foundation mixture at step (iv), and then incubating for 30-35 days with humidity of 72%-75% with the combination of stirring with the frequency of once every two days for 10-15 minutes at an average speed of 50-100 rpm, that to create the after incubation mixture;

wherein the microorganism ingredient at step (i) and (v) including *Azotobacter chroococcum* having a density of at least 109 CFU/g, *Bacillus polyfermenticus* having a density at least 109 CFU/g, *Saccharomyces*, *Streptomyces* at least 107 CFU/g, and *Trichoderma* at least 103 CFU/g.

According to the preferred embodiment of the present invention, the starter solution, the rock-salt ingredient, the microorganism ingredient, the micronutrient solution, the manure ingredient, the poultry manure ingredient, the organic waste ingredient, and the avocado extract ingredients, all are transformed by the process from steps (i) to (v) that yields chemical components of the after incubation mixture form consisting of: an elemental nitrogen (N) having 28%-30% by weight, an elemental phosphorus (P) having 1%-1.5% by weight, an elemental potassium (K) having 2.5%-3% by weight, an elemental sulfur (S) having 0.9%-1% by weight, an elemental calcium (Ca) having 23%-25% by weight, an elemental magnesium (Mg) having 0.9%-1% by weight, an elemental carbon (C) having 34%-35% by weight, an elemental copper (Cu) having 0.005%-0.01% by weight, an elemental zinc (Zn) having 0.025%-0.1% by weight, an elemental manganese (Mn) having 0.025%-0.1% by weight, an elemental iron (Fe) having 0.5%-1% by weight, an elemental bo (B) having 0.002%-0.1% by weight, an elemental molybdenum (Mo) having 0.0003%-0.01% by weight, an elemental cadmium (Cd) having at least 0.00005% by weight, an elemental lead (Pb) having at least 0.0001% by weight, and an elemental mercury (Hg) having at least 0.0001% by weight.

According to the preferred embodiment of the present invention, the moisturizing ingredient created by mixing performed in a specific order from (a') to (c') comprising:

(a') preparing materials including an extracted pectin from the dragon fruit peel, acrylic acid, potassium persulfate, ethylene glycol dimethacrylate, Ammonium oxalate 0.25%, methanol, and protease enzyme;

wherein the extracted pectin from the dragon fruit peel created by steps comprising: choosing thick dragon fruit peel, non-rotten having a moisture of 80%-90%;

drying dragon fruit peel at 50° C.-60° C. for 20 hours to create a dried dragon fruit peel having moisture of 9%-10%;

pulverizing the dried dragon fruit peel having sizes from 1 to 2 mm to create pieces of dragon fruit peel;

extracting the dried dragon fruit peel mixture by ammonium oxalate 25% at 80° C.-90° C. for 30-40 minutes to create an extracted solution;

filtering the extract solution to create a first solution and a residue;

hydrolyzing the residue by protease enzyme at the temperature of 30° C.-40° C. for 50-60 minutes, then filtered by filter paper to create a second solution;

admixing the first solution with the second solution to create a third solution;

admixing the third solution with methanol to a ratio of 1:1 for 45 minutes to create a fourth solution;

centrifuging the fourth solution stirring at 300 rpm for 15 minutes to create a precipitate solution;

filtering and washing the precipitate solution with methanol to create a precipitate solution white;

drying and filtering the precipitate solution white at the temperature of 50° C.-60° C. for 20 hours to create the extracted pectin from the dragon fruit peel having a moisture of 9%-10%;

(b') grafting onto the extracted pectin from the dragon fruit peel with acrylic acid by steps comprising:

dissolving homogeneously 25-30 g of the extracted pectin from the dragon fruit peel into the water;

adding 0.1-0.3 g potassium persulfate with the combination of stirring at 70° C. for 30 min;

adding 40-50 mL acrylic acid with the combination of stirring at 50° C. for 10 min; adding 0.1-0.3 g ethylene glycol dimethacrylate with the combination of stirring for 2-5 minutes, then do not stir for 2-3 hours to create a pectin-acrylic acid mixture; and (c') washing the pectin-acrylic acid mixture with deionized water, then drying at 70° C.-80° C. to constant weight to create the moisturizing ingredient.

According to the preferred embodiment of the present invention, the ylang ylang extract ingredients from fresh ylang ylang flowers that can be chopped/or not shredded and soaked in a liquid such as water or solvent for a long time to extract the necessary compound components from the infused ylang ylang flowers into the liquid; wherein the ylang ylang extract ingredients containing at least 0.05% by weight of a cinnamyl acetate.

The multipurpose fertilizer composition according to the present invention is used simple, for arid areas without irrigation, it is necessary to fertilize at the end of the dry season or at the beginning of the rainy season, increase the water holding capacity of the soil, maintain soil moisture in the local conditions. Without irrigation water for a long time, contributes to improving the survival rate of plants. The application of fertilizer is similar to giving plant medicine, that is, it must be reapplied after a certain time.

The example is made according to the embodiment of the present invention. The multipurpose fertilizer composition is created by process 100 with a capacity of 1000 kg/batch including five examples listed in Table 1 below.

TABLE 1

Mixed ingredients of the multipurpose fertilizer composition in five examples according to the embodiment of the present invention

| No. | Name of | | Unit (kg) | | | | |
|---|---|---|---|---|---|---|---|
| | | | Example 1 | Example 2 | Example 3 | Example 4 | Example 5 |
| 1 | A starter solution | | 150 | 100 | 120 | 100 | 150 |
| 2 | A rock-salt ingredient | | 30 | 20 | 24.5 | 20 | |
| 3 | Microorganism ingredient | | 0.05 | 0.05 | 0.05 | 0.05 | 0.05 |
| 4 | Manure ingredient | Goat manure | 100 | 100 | 100 | 100 | |
| | | Pig manure | 100 | 100 | 100 | 100 | 100 |
| | | Cow manure | 200 | 200 | 200 | 200 | 200 |
| 5 | Poultry manure | Chicken manure | 114.5 | 114.5 | 120 | 120 | 120 |
| | | Duck manure | 57 | 57 | 60 | 60 | 60 |
| | | Quail manure | 28.5 | 28.5 | 30 | 30 | 30 |
| 6 | Organic waste ingredient | Durian peel | 40 | 45.5 | 50 | 50 | 50 |
| | | Jackfruit waste | 45 | 45.5 | 50 | 50 | 50 |
| | | Poultry eggshells or spoiled poultry eggs | 150 | 93.5 | 100 | 100 | 100 |
| 7 | Avocado extract ingredients | | 7 | 5 | 5 | 5 | 15 |
| 8 | Micronutrient solution | | 120 | 120 | 120 | 120 | 120 |
| 9 | Moisturizing ingredient | | 50 | 60 | 60 | 55 | 55 |
| 10 | Ylang ylang extract ingredients | | 7.5 | 10 | 10 | 9.5 | 9.5 |

According to some example embodiment mentioned in Table 1, mass loss by weight after incubating at step 105 according to examples from example 1 to example 5 having the corresponding values 20%, 10%, 15%, 12%, and 18%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, element components, and/or groups thereof.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order, or steps may be added, deleted, or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A multipurpose fertilizer composition comprising:
   (a) an after incubation mixture;
   (b) a moisturizing ingredient; and
   (c) a ylang ylang extract ingredients;
   wherein the after incubation mixture is obtained by mixing performed in a specific order from (i) to (v) comprising:
   (i) mixing a starter solution with a rock-salt ingredient, and a microorganism ingredient, then all incubated at temperature 40° C. for 10 hours; creating a first temporary mixture;
   wherein the starter solution having 10%-15% by weight, the rock-salt ingredient having 2% by weight, and the microorganism ingredient having 0.01% by weight;
   wherein the starter solution created by mixing performed in a specific order from (a) to (f) comprising:
   (a) preparing root vegetables including a beetroot, a sugar beet, and a radish;
   (b) washing, chopping, or grinding the root vegetables at step (a) to create a pretreatment root vegetable;
   (c) creating a hydrolyzed mixture by hydrolyzing the pretreatment root vegetable at step (b) with an enzyme solution for 5 minutes; wherein the enzyme solution is obtained by mixing a ratio of cellulose enzyme, amylase enzyme, and protease enzyme having 2:2:1;
   (d) adding water to the hydrolyzed mixture at step (c) to a ratio of 5:1, with combination of stirring and heating at 85° C.-100° C. for 10 minutes to create a mixture after heating;
   (e) creating a filter solution by filtering the mixture after heating at step (d);
   (f) condensing the filter solution at step (e) at 85° C.-100° C. for 30-45 minutes to create the starter solution;
   (ii) mixing a manure ingredient with a poultry manure ingredient, an organic waste ingredient, and an avocado extract ingredients; then all continuously stirring at an average speed of 200-500 rpm for 15 minutes to create a second temporary mixture;
   wherein the manure ingredient having 35% by weight, the poultry manure ingredient having 20% by weight, the organic waste ingredient having 15% by weight, and the avocado extract ingredients having 0.5%-3% by weight;
   the manure ingredient created by mixing a goat manure ingredient with a pig manure ingredient, and a cow manure ingredient; wherein a ratio of the goat manure ingredient having moisture of 30%-35% with the pig manure ingredient having moisture of 30%-35%, and the cow manure ingredient having moisture of 30%-35% having 1:1:2;
   the poultry manure ingredient created by mixing a chicken manure ingredient with a duck manure ingredient, and a quail manure ingredient; wherein a ratio of the chicken manure ingredient having moisture of 30%-35% with the duck manure ingredient having moisture of 30%-35%, and the quail manure ingredient having moisture of 30%-35% having 4:2:1;
   the organic waste ingredient including durian peel, jackfruit waste, and poultry eggshells or spoiled poultry eggs; then all treated at 85° C.-100° C. for 30 minutes, then grinding and hydrolyzing with an enzyme solution;
   wherein said jackfruit waste including jackfruit peel, jackfruit fiber, and jackfruit seeds;
   wherein said poultry eggshells or spoiled poultry eggs are chicken eggshells, spoiled chicken eggshells;
   wherein said enzyme solution created by mixing a ratio of cellulose enzyme, amylase enzyme, and protease enzyme having 2:2:1;
   the avocado extract ingredients is a plant material that can be chopped/or not shredded and soaked in a liquid to extract the necessary compound components from the infused avocado into the liquid;
   (iii) mixing the first temporary mixture at step (i) with the second temporary mixture at step (ii), and a micronutrient solution having 12% by weight to create a basic mixture;
   wherein 1 liter of the micronutrient solution created by mixing performed in a specific order from (A) to (G) comprising:
   (H) diluting 0.1 liters of 68% $HNO_3$ into 0.3 liters of water to create a dilute solution of $HNO_3$;
   (I) adding 100 g of a multi-metallic ore powder into the dilute solution of $HNO_3$ at step (A), and continuously stirring at 25° C.-27° C. for 30 minutes; then, increase the temperature to 70° C.-80° C. and continuously stirring for 10 minutes to create a first solution;
   (J) filtering the first solution at step (B) by filter paper, creating a first residues;
   (K) adding 0.1 liters of $HNO_3$ 68% into the first residues at step (C), continuously stirring for 30 minutes at 75° C.-90° C., then filtered by filter paper to create a second residue;
   (L) adding 0.8 liter of aqua regia solution into the second residue at step (D), continuously stirring at 95° C.-110° C. for 30 minutes; then filtered by filter paper to create a filtrate; wherein the aqua regia solution including 0.6 liter HCl 36% and 0.2 liters $HNO_3$ 68%;
   (M) adjusting pH of the filtrate at step (E) by $NH_4OH$ solution until the filtrate having pH=8;
   (N) adding water into the filtrate having pH=8 just enough 1 liter to create 1 liter of the micronutrient solution;
   (iv) adjusting pH and humidity of the basic mixture at step (iii) to create a foundation mixture;
   wherein adjusting the humidity of the basic mixture to 72%-75%;
   wherein adjusting the pH of the basic mixture to pH=7;
   (v) adding 0.04% by weight of the microorganism ingredient into the foundation mixture at step (iv), and then incubating for 30-35 days with humidity of 72%-75% with the combination of stirring with the frequency of once every two days for 10-15 minutes at an average speed of 50-100 rpm, that to create the after incubation mixture;
   wherein the moisturizing ingredient created by mixing performed in a specific order from (a') to (c') comprising:
   (a') preparing materials including an extracted pectin from the dragon fruit peel, acrylic acid, potassium persulfate, ethylene glycol dimethacrylate, Ammonium oxalate 0.25%, methanol, and protease enzyme;
   wherein the extracted pectin from the dragon fruit peel created by steps comprising:
   choosing thick dragon fruit peel, non-rotten having a moisture of 80%-90%;

drying dragon fruit peel at 50° C.-60° C. for 20 hours to create a dried dragon fruit peel having moisture of 9%-10%;
pulverizing the dried dragon fruit peel having sizes from 1 to 2 mm to create pieces of dragon fruit peel;
extracting the dried dragon fruit peel mixture by ammonium oxalate 25% at 80° C.-90° C. for 30-40 minutes to create an extracted solution;
filtering the extract solution to create a first solution and a residue;
hydrolyzing the residue by protease enzyme at the temperature of 30° C.-40° C. for 50-60 minutes, then filtered by filter paper to create a second solution;
admixing the first solution with the second solution to create a third solution;
admixing the third solution with methanol to a ratio of 1:1 for 45 minutes to create a fourth solution;
centrifuging the fourth solution stirring at 300 rpm for 15 minutes to create a precipitate solution;
filtering and washing the precipitate solution with methanol to create a precipitate solution white;
drying and filtering the precipitate solution white at the temperature of 50° C.-60° C. for 20 hours to create the extracted pectin from the dragon fruit peel having a moisture of 9%-10%;
(b') grafting onto the extracted pectin from the dragon fruit peel with acrylic acid by steps comprising:
dissolving homogeneously 25-30 g of the extracted pectin from the dragon fruit peel into the water;
adding 0.1-0.3 g potassium persulfate with the combination of stirring at 70° C. for 30 min;
adding 40-50 mL acrylic acid with the combination of stirring at 50° C. for 10 min;
adding 0.1-0.3 g ethylene glycol dimethacrylate with the combination of stirring for 2-5 minutes, then do not stir for 2-3 hours to create a pectin-acrylic acid mixture; and
(c') washing the pectin-acrylic acid mixture with deionized water, then drying at 70° C.-80° C. to constant weight to create the moisturizing ingredient;
wherein the ylang ylang extract ingredients from fresh ylang ylang flowers that can be chopped/or not shredded and soaked in a liquid to extract the necessary compound components from the infused ylang ylang flowers into the liquid;
wherein the ylang ylang extract ingredients containing at least 0.05% by weight of a cinnamyl acetate.

2. The multipurpose fertilizer composition of claim 1, wherein the starter solution, the rock-salt ingredient, the microorganism ingredient, the micronutrient solution, the manure ingredient, the poultry manure ingredient, the organic waste ingredient, and the avocado extract ingredients, all are transformed by the process from step (i) to step (v) that yields chemical components of the after incubation mixture form consisting of:
an elemental nitrogen (N) having 28%-30% by weight;
an elemental phosphorus (P) having 1%-1.5% by weight;
an elemental potassium (K) having 2.5%-3% by weight;
an elemental sulfur (S) having 0.9%-1% by weight;
an elemental calcium (Ca) having 23%-25% by weight;
an elemental magnesium (Mg) having 0.9%-1% by weight;
an elemental carbon (C) having 34%-35% by weight;
an elemental copper (Cu) having 0.005%-0.01% by weight;
an elemental zinc (Zn) having 0.025%-0.1% by weight;
an elemental manganese (Mn) having 0.025%-0.1% by weight;
an elemental iron (Fe) having 0.5%-1% by weight;
an elemental bo (B) having 0.002%-0.1% by weight;
an elemental molybdenum (Mo) having 0.0003%-0.01% by weight;
an elemental cadmium (Cd) having at least 0.00005% by weight;
an elemental lead (Pb) having at least 0.0001% by weight; and
an elemental mercury (Hg) having at least 0.0001% by weight.

3. The multipurpose fertilizer composition of claim 2, wherein the microorganism ingredient at step (i) and (v) including *Azotobacter chroococcum* having a density of at least 109 CFU/g, *Bacillus polyfermenticus* having a density at least 109 CFU/g, *Saccharomyces, Streptomyces* having a density of at least 107 CFU/g, and *Trichoderma* having a density of at least 103 CFU/g.

4. A process of manufacturing multipurpose fertilizer composition comprising:
(i) mixing a starter solution with a rock-salt ingredient, and a microorganism ingredient, then all incubated at temperature 40° C. for 10 hours to create a first temporary mixture;
wherein the starter solution having 10%-15% by weight, the rock-salt ingredient having 2% by weight, and the microorganism ingredient having 0.01% by weight;
wherein the starter solution created by mixing performed in a specific order from (a) to (f) comprising:
(a) preparing root vegetables including a beetroot, a sugar beet, and a radish;
(b) washing, chopping, or grinding the root vegetables at step (a) to create a pretreatment root vegetable;
(c) creating a hydrolyzed mixture by hydrolyzing the pretreatment root vegetable at step (b) with an enzyme solution for 5 minutes; wherein the enzyme solution is obtained by mixing a ratio of cellulose enzyme, amylase enzyme, and protease enzyme having 2:2:1;
(d) adding water to the hydrolyzed mixture at step (c) to a ratio of 5:1, with combination of stirring and heating at 85° C.-100° C. for 10 minutes to create a mixture after heating;
(e) creating a filter solution by filtering the mixture after heating at step (d);
(f) condensing the filter solution at step (e) at 85° C.-100° C. for 30-45 minutes to create the starter solution;
(ii) mixing a manure ingredient with a poultry manure ingredient, an organic waste ingredient, and an avocado extract ingredients; then all continuously stirring at an average speed of 200-500 rpm for 15 minutes to create a second temporary mixture; wherein the manure ingredient having 35% by weight, the poultry manure ingredient having 20% by weight, the organic waste ingredient having 15% by weight, and the avocado extract ingredients having 0.5%-3% by weight;
the manure ingredient created by mixing a goat manure ingredient with a pig manure ingredient, and a cow manure ingredient; wherein a ratio of the goat manure ingredient having moisture of 30%-35% with the pig manure ingredient having moisture of 30%-35%, and the cow manure ingredient having moisture of 30%-35% having 1:1:2;

the poultry manure ingredient created by mixing a chicken manure ingredient with a duck manure ingredient, and a quail manure ingredient; wherein a ratio of the chicken manure ingredient having moisture of 30%-35% with the duck manure ingredient having moisture of 30%-35%, and the quail manure ingredient having moisture of 30%-35% having 4:2:1;

the organic waste ingredient including durian peel, jackfruit waste, and poultry eggshells or spoiled poultry eggs; then all treated at 85° C.-100° C. for 30 minutes, then grinding and hydrolyzing with an enzyme solution;
   wherein said jackfruit waste including jackfruit peel, jackfruit fiber, and jackfruit seeds;
   wherein said poultry eggshells or spoiled poultry eggs are chicken eggshells, spoiled chicken eggshells;
   wherein said enzyme solution created by mixing a ratio of cellulose enzyme, amylase enzyme, and protease enzyme having 2:2:1;

the avocado extract ingredients is a plant material that can be chopped/or not shredded and soaked in a liquid to extract the necessary compound components from the infused avocado into the liquid;

(iii) mixing the first temporary mixture at step (i) with the second temporary mixture at step (ii), and a micronutrient solution having 12% by weight to create a basic mixture;

wherein 1 liter of the micronutrient solution created by mixing performed in a specific order from (A) to (G) comprising:
   (H) diluting 0.1 liters of 68% $HNO_3$ into 0.3 liters of water to create a dilute solution of $HNO_3$;
   (I) adding 100 g of a multi-metallic ore powder into the dilute solution of $HNO_3$ at step (A), and continuously stirring at 25° C.-27° C. for 30 minutes; then, increase the temperature to 70° C.-80° C. and continuously stirring for 10 minutes to create a first solution;
   (J) filtering the first solution at step (B) by filter paper, creating a first residues;
   (K) adding 0.1 liters of $HNO_3$ 68% into the first residues at step (C), continuously stirring for 30 minutes at 75° C.-90° C., then filtered by filter paper to create a second residue;
   (L) adding 0.8 liter of aqua regia solution into the second residue at step (D), continuously stirring at 95° C.-110° C. for 30 minutes; then filtered by filter paper to create a filtrate; wherein the aqua regia solution including 0.6 liter HCl 36% and 0.2 liters $HNO_3$ 68%;
   (M) adjusting pH of the filtrate at step (E) by $NH_4OH$ solution until the filtrate having pH=8;
   (N) adding water into the filtrate having pH=8 just enough 1 liter to create 1 liter of the micronutrient solution;

(iv) adjusting pH and humidity of the basic mixture at step (iii) to create a foundation mixture;
wherein adjusting the humidity of the basic mixture to 72%-75%;
wherein adjusting the pH of the basic mixture to pH=7;

(v) adding 0.04% by weight of the microorganism ingredient into the foundation mixture at step (iv), and then incubating for 30-35 days with humidity of 72%-75% with the combination of stirring with the frequency of once every two days for 10-15 minutes at an average speed of 50-100 rpm, that to create an after incubation mixture;

(vi) adding 5%-6% by weight of a moisturizing ingredient into the after incubation mixture at step (v) to create a third temporary mixture;

wherein the moisturizing ingredient created by mixing performed in a specific order from (a') to (c') comprising:
   (a') preparing materials including an extracted pectin from the dragon fruit peel, acrylic acid, potassium persulfate, ethylene glycol dimethacrylate, Ammonium oxalate 0.25%, methanol, and protease enzyme;
   wherein the extracted pectin from the dragon fruit peel created by steps comprising:
      choosing thick dragon fruit peel, non-rotten having a moisture of 80%-90%;
      drying dragon fruit peel at 50° C.-60° C. for 20 hours to create a dried dragon fruit peel having moisture of 9%-10%;
      pulverizing the dried dragon fruit peel having sizes from 1 to 2 mm to create pieces of dragon fruit peel;
      extracting the dried dragon fruit peel mixture by ammonium oxalate 25% at 80° C.-90° C. for 30-40 minutes to create an extracted solution;
      filtering the extract solution to create a first solution and a residue;
      hydrolyzing the residue by protease enzyme at the temperature of 30° C.-40° C. for 50-60 minutes, then filtered by filter paper to create a second solution;
      admixing the first solution with the second solution to create a third solution;
      admixing the third solution with methanol to a ratio of 1:1 for 45 minutes to create a fourth solution;
      centrifuging the fourth solution stirring at 300 rpm for 15 minutes to create a precipitate solution;
      filtering and washing the precipitate solution with methanol to create a precipitate solution white;
      drying and filtering the precipitate solution white at the temperature of 50° C.-60° C. for 20 hours to create the extracted pectin from the dragon fruit peel having a moisture of 9%-10%;
   (b') grafting onto the extracted pectin from the dragon fruit peel with acrylic acid by steps comprising:
      dissolving homogeneously 25-30 g of the extracted pectin from the dragon fruit peel into the water;
      adding 0.1-0.3 g potassium persulfate with the combination of stirring at 70° C. for 30 min;
      adding 40-50 mL acrylic acid with the combination of stirring at 50° C. for 10 min;
      adding 0.1-0.3 g ethylene glycol dimethacrylate with the combination of stirring for 2-5 minutes, then do not stir for 2-3 hours to create a pectin-acrylic acid mixture; and
   (c') washing the pectin-acrylic acid mixture with deionized water, then drying at 70° C.-80° C. to constant weight to create the moisturizing ingredient;

(vii) adjusting pH and humidity of the third temporary mixture at step (vi) to create a temporary fourth mixture;
wherein adjusting the humidity of the third temporary mixture to 32%-35%;
wherein adjusting the pH of the third temporary mixture to 7-7.5;

(viii) adding a ylang ylang extract ingredients into the fourth mixture at step (vii) create to a fifth mixture; wherein the ylang ylang extract ingredients having 0.75%-1% by weight;
wherein the ylang ylang extract ingredients from fresh ylang ylang flowers that can be chopped/or not shredded and soaked in a liquid to extract the necessary compound components from the infused ylang ylang flowers into the liquid;
wherein the ylang ylang extract ingredients containing at least 0.05% by weight of a cinnamyl acetate;
(ix) shaping the fifth mixture to pre-determined sizes, then packing and storing to create the multipurpose fertilizer composition.

5. The process of claim 4, wherein the microorganism ingredient at step (i) and (v) including *Azotobacter chroococcum* having a density of at least 109 CFU/g, *Bacillus polyfermenticus* having a density at least 109 CFU/g, *Saccharomyces, Streptomyces* having a density of at least 107 CFU/g, and *Trichoderma* having a density of at least 103 CFU/g.

6. The process of claim 4, wherein the starter solution, the rock-salt ingredient, the microorganism ingredient, the micronutrient solution, the manure ingredient, the poultry manure ingredient, the organic waste ingredient, and the avocado extract ingredients, all are transformed by the process from step (i) to step (v) that yields chemical components of the after incubation mixture form consisting of:
an elemental nitrogen (N) having 28%-30% by weight;
an elemental phosphorus (P) having 1%-1.5% by weight;
an elemental potassium (K) having 2.5%-3% by weight;
an elemental sulfur (S) having 0.9%-1% by weight;
an elemental calcium (Ca) having 23%-25% by weight;
an elemental magnesium (Mg) having 0.9%-1% by weight;
an elemental carbon (C) having 34%-35% by weight;
an elemental copper (Cu) having 0.005%-0.01% by weight;
an elemental zinc (Zn) having 0.025%-0.1% by weight;
an elemental manganese (Mn) having 0.025%-0.1% by weight;
an elemental iron (Fe) having 0.5%-1% by weight;
an elemental bo (B) having 0.002%-0.1% by weight;
an elemental molybdenum (Mo) having 0.0003%-0.01% by weight;
an elemental cadmium (Cd) having at least 0.00005% by weight;
an elemental lead (Pb) having at least 0.0001% by weight; and
an elemental mercury (Hg) having at least 0.0001% by weight.

* * * * *